US011362718B2

(12) United States Patent
Ryu et al.

(10) Patent No.: US 11,362,718 B2
(45) Date of Patent: Jun. 14, 2022

(54) SIDELINK TX POWER CONTROL

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/931,399

(22) Filed: May 13, 2020

(65) Prior Publication Data

US 2020/0395991 A1    Dec. 17, 2020

Related U.S. Application Data

(60) Provisional application No. 62/862,552, filed on Jun. 17, 2019.

(51) Int. Cl.
*H04W 52/34* (2009.01)
*H04B 7/06* (2006.01)
(Continued)

(52) U.S. Cl.
CPC ......... *H04B 7/0695* (2013.01); *H04B 17/102* (2015.01); *H04W 52/242* (2013.01);
(Continued)

(58) Field of Classification Search
CPC ... H04W 92/18; H04W 76/14; H04W 52/346; H04W 52/367; H04W 4/40; H04W 52/34;
(Continued)

(56) References Cited

U.S. PATENT DOCUMENTS

| 11,005,624 | B2* | 5/2021 | Kim | H04L 1/1671 |
| 2020/0022089 | A1* | 1/2020 | Guo | H04L 5/0048 |
| 2021/0022091 | A1* | 1/2021 | Li | H04W 52/242 |

FOREIGN PATENT DOCUMENTS

WO    WO-2018113676 A1    6/2018

OTHER PUBLICATIONS

AT&T: "Physical Layer Procedures for NR Sidelink Design", 3GPP Draft, 3GPP TSG RAN WG1 Ad-Hoc Meeting 1901, R1-1900443 Physical Layer Procedures for NR Sidelink Design, 3rd Generation Partnership Project (3GPP), Mobile Competence Centre, 650, Route Des Lucioles, F-06921 Sophia-Antipolis Cedex, vol. RAN WG1, No. Taipei, Taiwan, Jan. 21, 2019-Jan. 25, 2019, Jan. 20, 2019 (Jan. 20, 2019), XP051593356, 8 pages, Retrieved from the Internet: URL: http://www.3gpp.org/ftp/Meetings%5F3GPP%5FSYNC/RAN1/Docs/R1%2D1900443%2Ezip, [retrieved on Jan. 20, 2019], paragraph [0005].

(Continued)

*Primary Examiner* — Tu X Nguyen
(74) *Attorney, Agent, or Firm* — QUALCOMM Incorporated

(57) ABSTRACT

Sidelink TX power control is disclosed. In a particular implementation, a method of wireless communication includes selecting, by a user equipment (UE), a first access link of multiple access links. Each of the multiple access links available for communication between the UE and a base station. The method also includes determining, by the UE, a sidelink transmission power based on the first access link. The method further includes transmitting, by the UE, data to an electronic device via a sidelink based on the sidelink transmission power.

30 Claims, 10 Drawing Sheets

(51) Int. Cl.
*H04B 17/10* (2015.01)
*H04W 72/04* (2009.01)
*H04W 76/14* (2018.01)
*H04W 52/32* (2009.01)
*H04W 52/24* (2009.01)

(52) U.S. Cl.
CPC ....... *H04W 52/322* (2013.01); *H04W 72/042* (2013.01); *H04W 72/046* (2013.01); *H04W 76/14* (2018.02)

(58) Field of Classification Search
CPC ....... H04W 76/15; H04W 88/04; H04W 4/46; H04W 52/38; H04W 52/08; H04W 52/54; H04W 76/10; H04W 52/18; H04W 52/32; H04W 52/58; H04L 25/0226; H04L 5/0057; H04L 1/06; H01Q 21/00
See application file for complete search history.

(56) References Cited

OTHER PUBLICATIONS

International Search Report and Written Opinion—PCT/US2020/032789—ISAEPO—dated Sep. 21, 2020 (193350WO).
Partial International Search Report—PCT/US2020/032789—ISAEPO—dated Jul. 29, 2020 (193350WO).

\* cited by examiner

SIDELINK TX POWER CONTROL

CROSS-REFERENCE TO RELATED APPLICATIONS

This application claims the benefit of U.S. Provisional Patent Application No. 62/862,552, entitled, "SIDELINK TX POWER CONTROL," filed on Jun. 17, 2019, which is expressly incorporated by reference herein in its entirety.

BACKGROUND

Field

Aspects of the present disclosure relate generally to wireless communication systems, and more particularly, to sidelink TX power control.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In some wireless communications systems, UEs communicate with base stations via access links (e.g., a communication link between UE(s) and gNB(s)) and UEs can communicate with other electronic devices using a sidelink (e.g., a communication link between UE(s) and another UE or a communication link between an IAB node and another IAB node). When a UE transmits using the sidelink, the UE needs to consider potential interference sidelink transmissions can cause on the access links. To account for the potential interference, the UE may control its sidelink transmission (TX) power. For example, the UE may perform sidelink (SL) open-loop power control. In some implementations, to perform the SL open-loop power control, the UE is configured to use downlink (DL) pathloss (between TX UE and gNB) only, SL pathloss (between TX UE and RX UE) only, or both DL pathloss and SL path loss, to determine the SL TX power. When the SL open-loop power control is configured to use both DL pathloss and SL pathloss, the minimum of the power values given by the SL open-loop power control based on DL pathloss and the open-loop power control based on SL pathloss is taken and used as the SL TX power. However, such an approach is flawed and can lead to undesirable results. For example, conventional SL open-loop power control schemes typically do not account for beam forming in mmWave in which signal energy is directed in certain directions. Additionally, conventional SL open-loop power control schemes typically do not account for the multiple access links that can be used during communication between a UE and a base station.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes selecting, by a user equipment (UE), a first access link of multiple access links. Each of the multiple access links available for communication between the UE and a base station. The method also includes determining, by the UE, a sidelink transmission power based on the first access link. The method further includes transmitting, by the UE, data to an electronic device via a sidelink based on the sidelink transmission power.

In an additional aspect of the disclosure, an apparatus configured for wireless communication includes means for selecting, by a user equipment (UE), a first access link of multiple access links. Each of the multiple access links available for communication between the UE and a base station. The apparatus also includes means for determining, by the UE, a sidelink transmission power based on the first access link. The apparatus further includes means for transmitting, by the UE, data to an electronic device via a sidelink based on the sidelink transmission power.

In an additional aspect of the disclosure, a non-transitory computer-readable medium having program code recorded thereon. The program code includes code to select, by a user equipment (UE), a first access link of multiple access links. Each of the multiple access links available for communication between the UE and a base station. The program code also includes code to determine, by the UE, a sidelink transmission power based on the first access link. The program code further includes code to transmit, by the UE, data to an electronic device via a sidelink based on the sidelink transmission power.

In an additional aspect of the disclosure, an apparatus configured for wireless communication is disclosed. The apparatus includes at least one processor, and a memory coupled to the processor. The processor is configured to select, by a user equipment (UE), a first access link of multiple access links. Each of the multiple access links available for communication between the UE and a base station. The processor is also configured to determine, by the UE, a sidelink transmission power based on the first access link. The processor is also configured to transmit, by the UE, data to an electronic device via a sidelink based on the sidelink transmission power.

In an additional aspect of the disclosure, a method of wireless communication includes selecting, by a base station, a first access link of multiple access links. Each of the multiple access links available for communication between the base station and user equipment (UE). The method also includes sending, by the base station, an indication of the first access link to the UE, the indication corresponding to a determination of a sidelink transmission power based on the first access link. The method further includes communicating, by the base station with the UE via one of the multiple access links, data while the UE communicates with an electronic device via a sidelink channel based on the sidelink transmission power.

In an additional aspect of the disclosure, an apparatus configured for wireless communication includes means for selecting, by a base station, a first access link of multiple access links. Each of the multiple access links available for communication between the base station and user equipment (UE). The apparatus also includes means for sending, by the base station, an indication of the first access link to the UE, the indication corresponding to a determination of a sidelink transmission power based on the first access link. The method further includes means for communicating, by the base station with the UE via one of the multiple access links, data while the UE communicates with an electronic device via a sidelink channel based on the sidelink transmission power.

In an additional aspect of the disclosure, a non-transitory computer-readable medium having program code recorded thereon. The program code includes code to select, by a base station, a first access link of multiple access links. Each of the multiple access links available for communication between the base station and user equipment (UE). The program code also includes code to send, by the base station, an indication of the first access link to the UE, the indication corresponding to a determination of a sidelink transmission power based on the first access link. The program code further includes code to communicate, by the base station with the UE via one of the multiple access links, data while the UE communicates with an electronic device via a sidelink channel based on the sidelink transmission power.

In an additional aspect of the disclosure, an apparatus configured for wireless communication is disclosed. The apparatus includes at least one processor, and a memory coupled to the processor. The processor is configured to select, by a base station, a first access link of multiple access links. Each of the multiple access links available for communication between the base station and user equipment (UE). The processor is also configured to send, by the base station, an indication of the first access link to the UE, the indication corresponding to a determination of a sidelink transmission power based on the first access link. The processor is further configured to communicate, by the base station with the UE via one of the multiple access links, data while the UE communicates with an electronic device via a sidelink channel based on the sidelink transmission power.

In an additional aspect of the disclosure, a method of wireless communication includes determining, by a user equipment (UE), an adjustment value based on an access link for communication between the UE and a base station and based on a sidelink for communication between the UE and an electronic device. The method also includes determining, by the UE, a sidelink transmission power based on the adjustment value. The method further includes transmitting, by the UE, data to the electronic device via the sidelink based on the sidelink transmission power.

In an additional aspect of the disclosure, an apparatus configured for wireless communication includes means determining, by a user equipment (UE), an adjustment value based on an access link for communication between the UE and a base station and based on a sidelink for communication between the UE and an electronic device. The apparatus also includes means for determining, by the UE, a sidelink transmission power based on the adjustment value. The apparatus further includes means for transmitting, by the UE, data to the electronic device via the sidelink based on the sidelink transmission power.

In an additional aspect of the disclosure, a non-transitory computer-readable medium having program code recorded thereon. The program code includes code to determine, by a user equipment (UE), an adjustment value based on an access link for communication between the UE and a base station and based on a sidelink for communication between the UE and an electronic device. The program code also includes code to determine, by the UE, a sidelink transmission power based on the adjustment value. The program code further includes code to transmit, by the UE, data to the electronic device via the sidelink based on the sidelink transmission power.

In an additional aspect of the disclosure, an apparatus configured for wireless communication is disclosed. The apparatus includes at least one processor, and a memory coupled to the processor. The processor is configured to determine, by a user equipment (UE), an adjustment value based on an access link for communication between the UE and a base station and based on a sidelink for communication between the UE and an electronic device. The processor is also configured to determine, by the UE, a sidelink transmission power based on the adjustment value. The processor is further configured to transmit, by the UE, data to the electronic device via the sidelink based on the sidelink transmission power.

In an additional aspect of the disclosure, a method of wireless communication includes selecting, by a base station, an adjustment value for a user equipment (UE) in communication with the base station via an access link. The method also includes sending, by the base station to the UE, an indication corresponding to the adjustment value via the access link, the indication corresponding to a determination of a sidelink transmission power based on the adjustment value. The method further includes communicating, by the base station with the UE via the access link, data while the UE communicates with an electronic device via a sidelink channel based on the sidelink transmission power.

In an additional aspect of the disclosure, an apparatus configured for wireless communication includes means for selecting, by a base station, an adjustment value for a user equipment (UE) in communication with the base station via an access link. The apparatus also includes means for sending, by the base station to the UE, an indication corresponding to the adjustment value via the access link, the indication corresponding to a determination of a sidelink transmission power based on the adjustment value. The apparatus further includes means for communicating, by the base station with the UE via the access link, data while the UE communicates with an electronic device via a sidelink channel based on the sidelink transmission power.

In an additional aspect of the disclosure, a non-transitory computer-readable medium having program code recorded thereon. The program code includes code to select, by a base station, an adjustment value for a user equipment (UE) in communication with the base station via an access link. The program code further includes code to send, by the base station to the UE, an indication corresponding to the adjustment value via the access link, the indication corresponding to a determination of a sidelink transmission power based on the adjustment value. The program code also includes code to communicate, by the base station with the UE via the access link, data while the UE communicates with an electronic device via a sidelink channel based on the sidelink transmission power.

In an additional aspect of the disclosure, an apparatus configured for wireless communication is disclosed. The apparatus includes at least one processor, and a memory coupled to the processor. The processor is configured to select, by a base station, an adjustment value for a user equipment (UE) in communication with the base station via an access link. The processor is also configured to send, by the base station to the UE, an indication corresponding to the adjustment value via the access link, the indication corresponding to a determination of a sidelink transmission power based on the adjustment value. The processor is further configured to communicate, by the base station with the UE via the access link, data while the UE communicates with an electronic device via a sidelink channel based on the sidelink transmission power.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
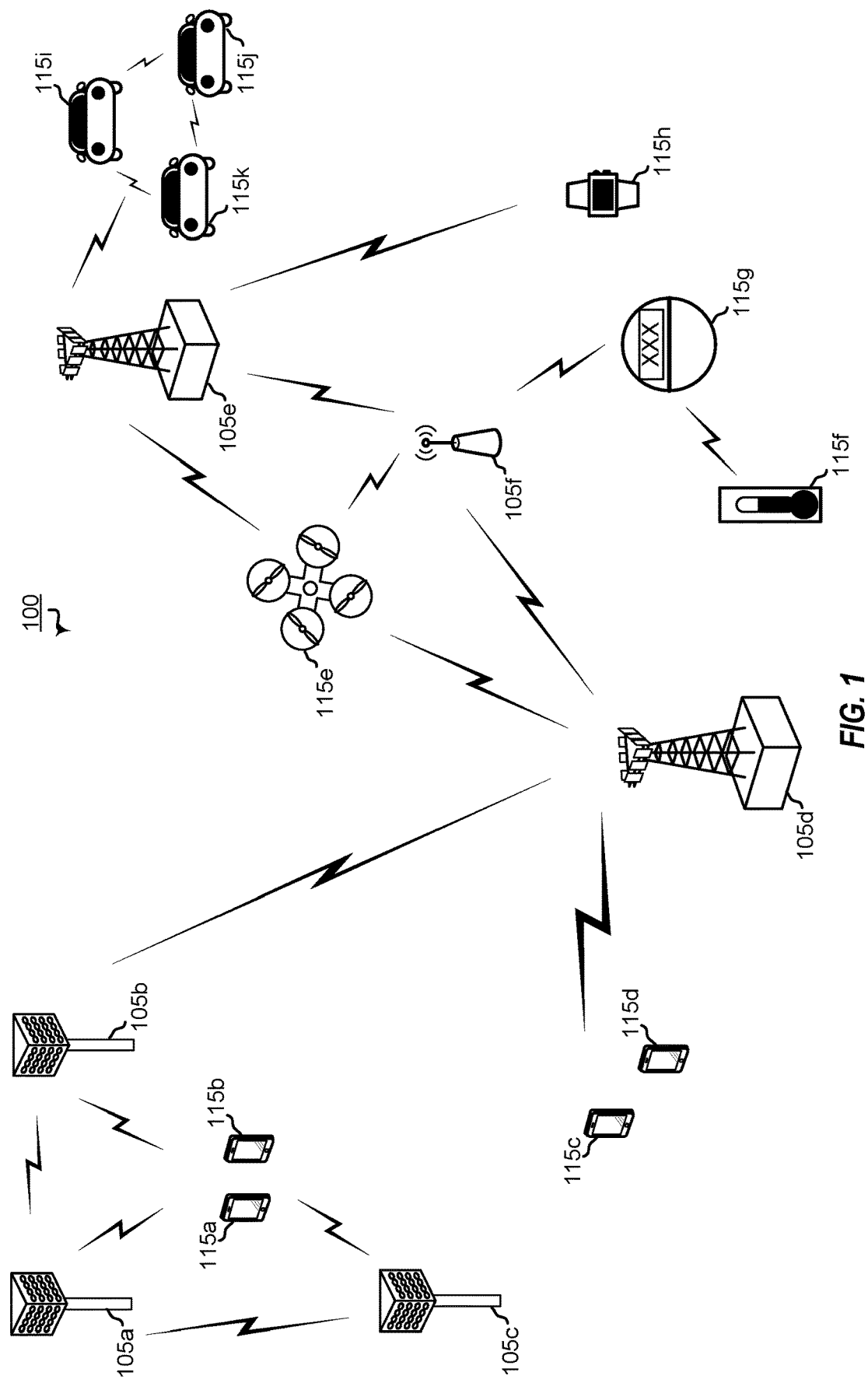
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks (sometimes referred to as "5G NR" networks/systems/devices), as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
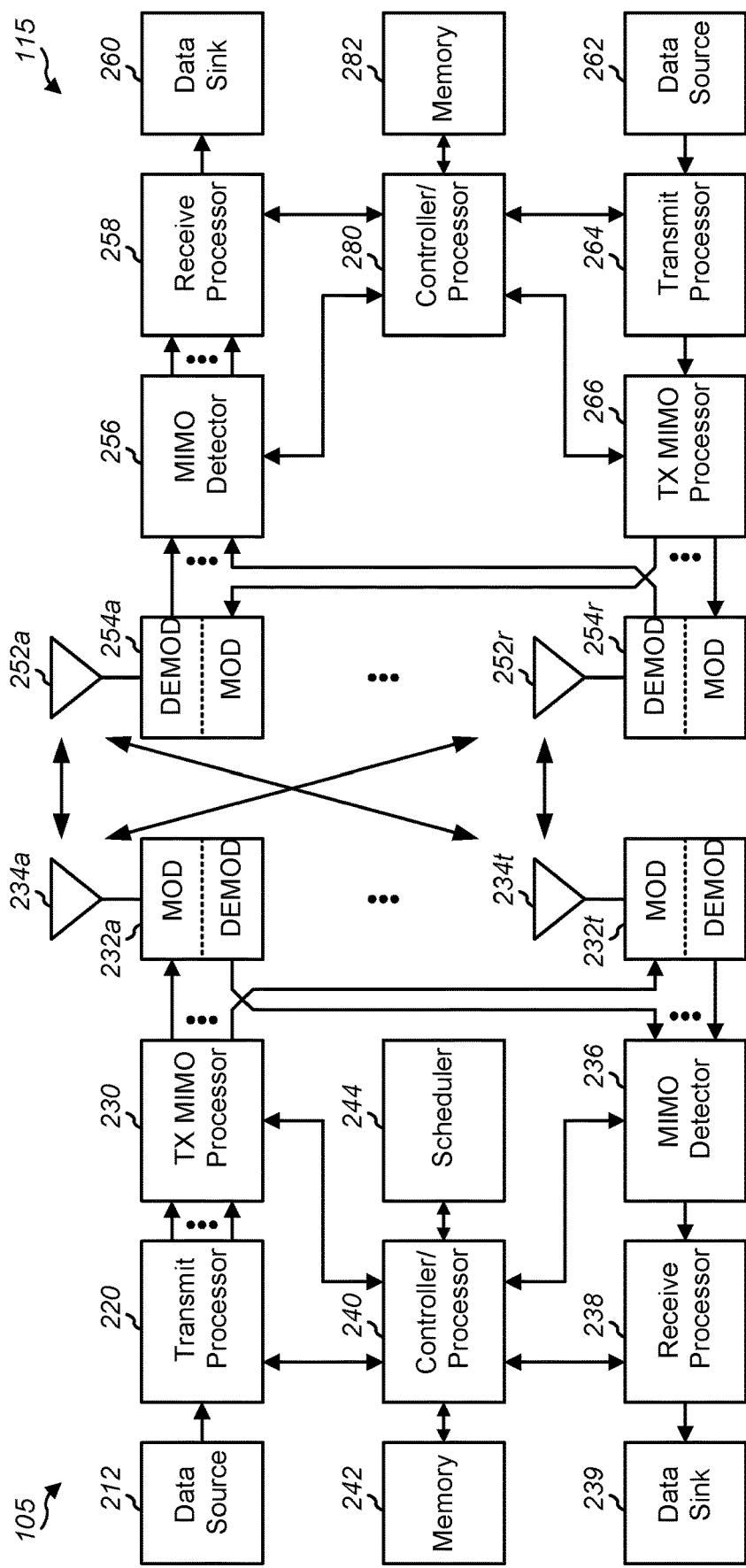
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein, such as perform or direct the execution of the function blocks illustrate in FIGS. 9-10. The controllers/processor 280 and/or other processors and modules at the UE 115 may also perform or direct the execution of the functional blocks illustrated in FIGS. 7-8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
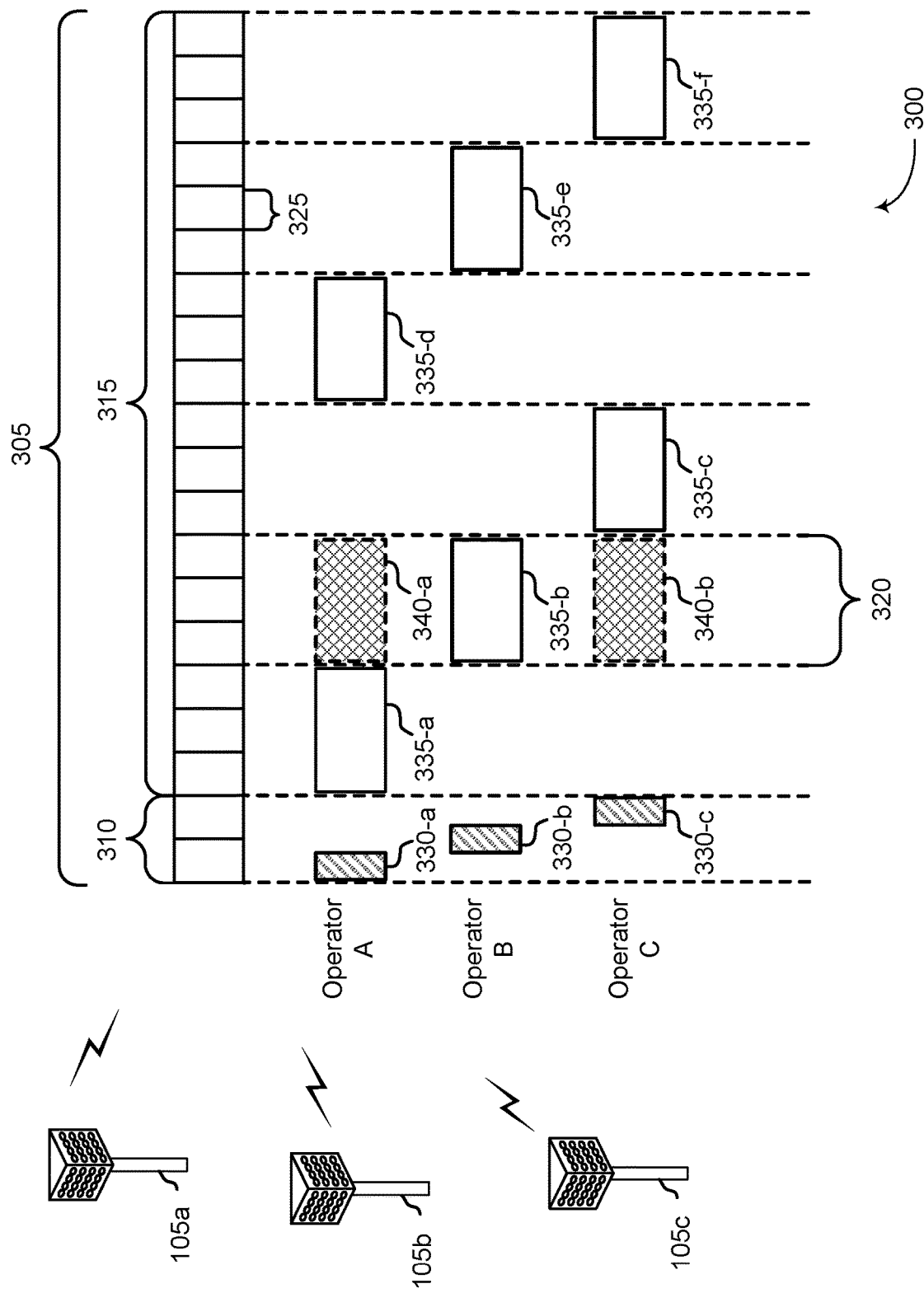
FIG. 3 is a diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain 0-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
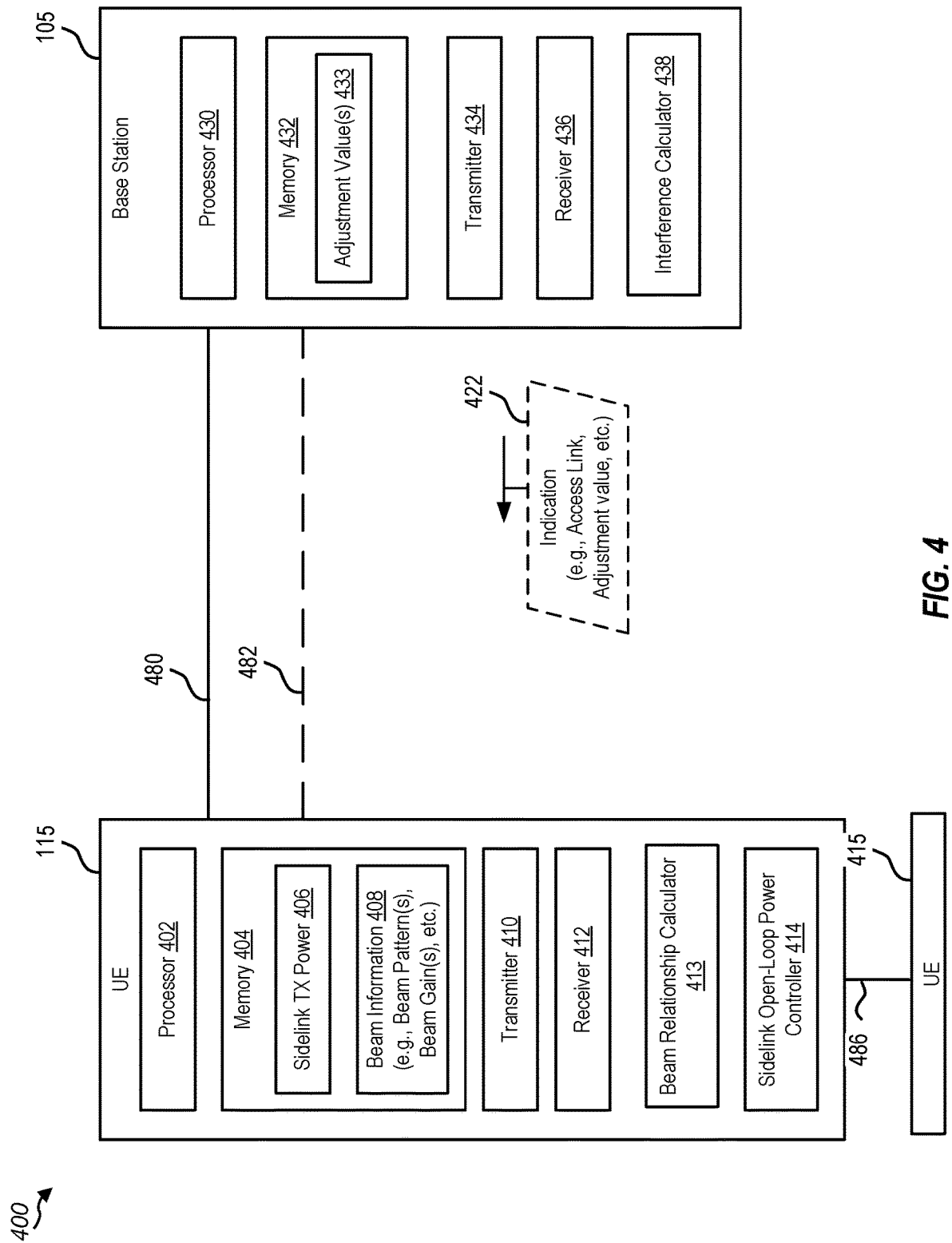
FIG. 4 is a diagram illustrating a wireless communication system including a base stations and UEs.

FIG. 4 illustrates an example of a wireless communications system 400 that supports sidelink TX power control in accordance with aspects of the present disclosure. In some examples, wireless communications system 400 may implement aspects of wireless communication system 100. For example, wireless communications system 400 may include UE 115, base station 105, and an electronic device 415. Electronic device 415 may include another UE. Although one UE and one base station are illustrated, in other implementations, wireless communications system 400 may include multiple UEs 115, multiple base stations 105, or both. UE 115 and base station 105 may be configured to communicate via one or more access links, such as a representative first access link 480 and a representative second access link 482. UE and electronic device 415 may be configured to communicate via a sidelink 486.

UE 115 includes processor 402, memory 404, transmitter 410, receiver 412, beam relationship calculator 413, and sidelink open-loop power controller 414. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store sidelink TX power value 406 and beam information 408, such as one or more beam patterns, one or more beam gains, one or more beam form directions, and the like.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Beam relationship calculator 413 is configured to determine relationship information between two or more links or beams (e.g., beam patterns). In some aspects, the relationship information may include or correspond to a relationship parameter (e.g., a spatial relationship parameter, an interference parameter, etc.) or relationship value (e.g., a spatial degree, an amount of interference, etc.). For example, beam relationship calculator 413 is configured to determine the relationship information. The relationship may be based on a radiation pattern of a downlink (DL) beam (also referred to as an access link beam or an access beam) corresponding to the first access link, a radiation pattern of a sidelink beam corresponding to the sidelink, or both. Additionally, or alternatively, the relationship may be based on a direction of a peak gain of the DL beam, a direction of a peak gain of the sidelink beam, or both. In some aspects, beam relationship calculator 413 determines which access link beam of the multiple beams corresponding to multiple access links is closest to the sidelink beam. For example, beam relationship calculator 413 may determining which access link beam of the multiple beams corresponding to multiple access links is closest to the sidelink beam based on a spatial relationship between each access link beam and the sidelink beam. The spatial relationship between two beams may be determined using beam information 408.

Sidelink open-loop power controller 414 is configured to determine sidelink TX power value 406. In addition, sidelink open-loop power controller 414 is configured to determine the sidelink transmission power based on the access link beam for the first access link 480 (e.g., a selected access link).

Base station 105 includes processor 430, memory 432, transmitter 434, receiver 436, and interference calculator 438. Processor 430 may be configured to execute instructions stores at memory 432 to perform the operations described herein. In some implementations, processor 430 includes or corresponds to controller/processor 240, and memory 432 includes or corresponds to memory 242. Memory 432 may also be configured to store one or more adjustment values 433, as further described herein. The one or adjustment values 433 may be provided to UE 115 to be used by UE 115 to determine sidelink TX power value 406.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Interference calculator 438 is configured to determine interference corresponding to (e.g., experience by) one or more access links. For example, interference calculator 438 may be configured to determine an amount of interference for first access link 480, second access link 482, or both.

Electronic device 415 may be configured to communicate with UE 115 and base station 105. It is noted that electronic device 415 may include one or more components, and/or be configured to perform one or more operations, as described with respect to UE 115 and base station 105.

During operation of wireless communications system 400, one or more access links (e.g, 480, 482) may be used for communication between UE 115 and base station 105. Additionally, sidelink 486 may be used for communication between UE 115 and electronic device 415. In some implementations, a frequency range used for sidelink 486 is within the same range of frequencies available for communication via the one or more access links. UE 115 may determine and use a sidelink TX power value 406 for communication via sidelink 486. In some implementations, UE 115 may use sidelink open-loop power controller 414 to determine sidelink TX power value 406.

In some implementations, UE 115 may communicate with base station 105 via a single access link, such as first access link 480. In such implementations, UE 115 may determine sidelink TX power value 406 based on a target receive (RX) power, a downlink (DL) pathloss, and a sidelink (SL) pathloss. To illustrate, the target RX power may be determined by UE 115, determined by electronic device 415, determined by (and provided to UE 115 by) base station 105, or negotiated between UE 115 and electronic device 415, as illustrative, non-limiting example. The DL pathloss may include or correspond to a pathloss corresponding to first access link 480 and SL pathloss may include or correspond to a pathloss corresponding to sidelink 486. DL pathloss may be determined by UE 115 or by base station 105 and communicated to UE 115. SL pathloss may be determined by UE 115 or by electronic device 415 and communicated to UE 115. Sidelink open-loop power controller 414 may be configured to determine the sidelink TX power value 406 as:

$$SL\ Tx\ \text{power} = \min\{\text{target}Rx\ \text{power} + DL\ \text{pathloss}, \text{target}Rx\ \text{power} + SL\ \text{pathloss}\},$$

where SL TX power is sidelink TX power value 406 and min is a minimum selection operation.

As an illustrative, first example, target Rx power=−80 dBm, DL pathloss=100 dB, SL pathloss=80 dB. It is noted that such values are used herein for illustration and are not intended to be limiting. In the first example, sidelink open-loop power controller 414 calculates sidelink TX power 406 as: SL Tx power=min{target Rx power+DL pathloss, target Rx power+SL pathloss}=min{−80 dBm+100 dB, −80 dBm+80 dB}=min{20 dBm, 0 dBm}. In the first example, SL Tx power (e.g., 406) is 0 dBm (using min of two power values). It is noted that in the first example, DL pathloss is much larger than SL pathloss, and transmitting at power that "matches" SL pathloss will not cause significant interference to DL; that is because the downlink path loss is much greater than the sidelink path loss.

As an illustrative, second example, target Rx power=−80 dBm, DL pathloss=80 dB, SL pathloss=100 dB. It is noted that such values are used herein for illustration and are not intended to be limiting. In the second example, sidelink open-loop power controller 414 calculates sidelink TX power 406 as: SL Tx power=min{target Rx power+DL pathloss, target Rx power+SL pathloss}=min{−80 dBm+80 dB, −80 dBm+100 dB}=min{0 dBm, 20 dBm}. SL Tx power in this case is 0 dBm also, but does not correspond to the transmit power that "matches" SL pathloss because if so, then there would be interference (e.g., significant interference) to access link 480. It is noted that if only SL pathloss is taken into consideration, SL Tx power will be 20 dBm and interference may occur with respect to first access link 480.

Figure 5:
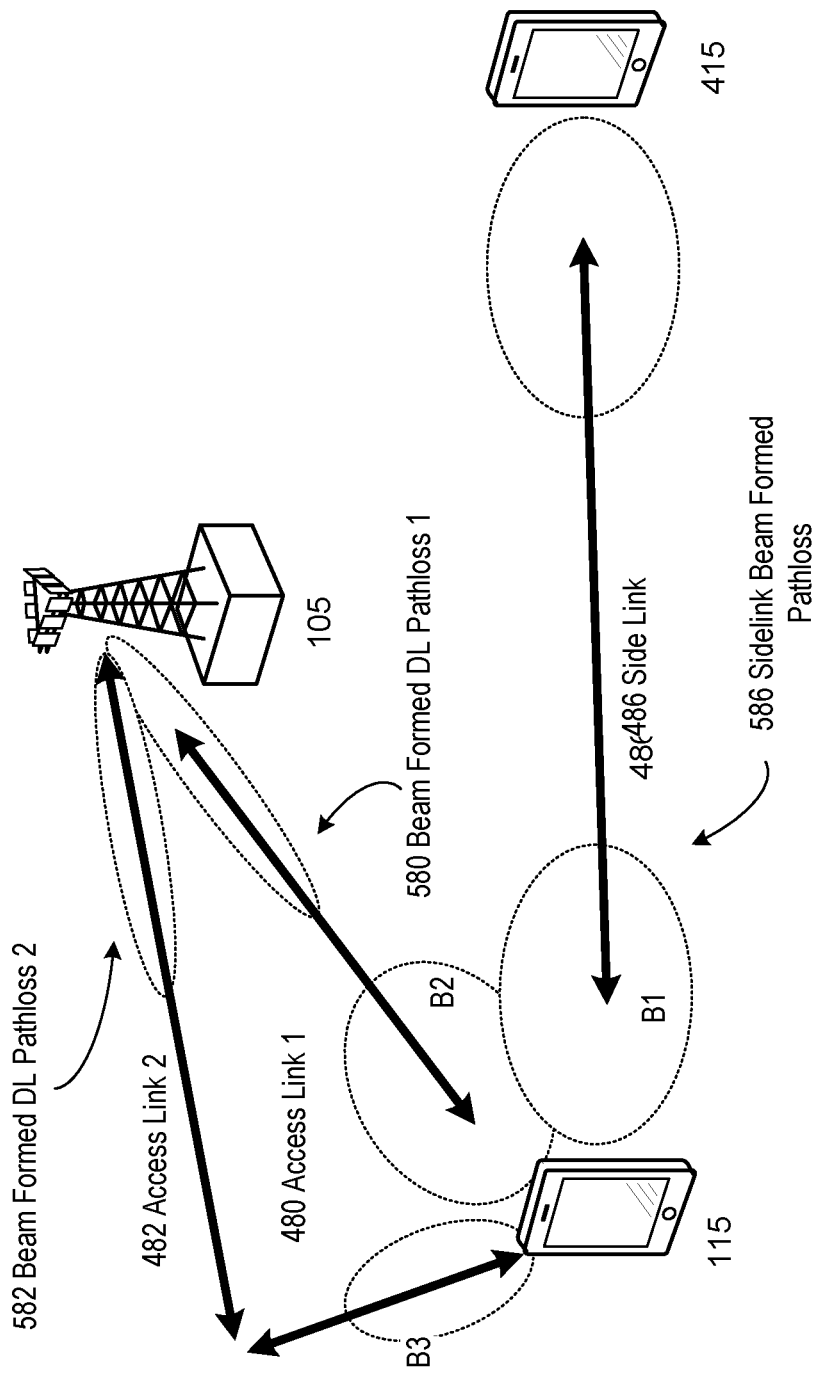
FIG. 5 is a diagram illustrating a wireless communication system including a base stations and UEs.

Referring to FIG. 5, an example of system 400 is shown in which multiple access links, e.g., first access link 480 and second access link 482, are present between UE 115 and base station 105. For example, FIG. 5 may be understood to illustrate use of mmWave in which base station 105 and UE 115 have multiple beam pairs for access links, such as two, three, or more access links.

As shown in FIG. 5, first access link 480 between UE 115 and base station 105 uses UE beam 2 (B2) of UE 115 and a corresponding base station beam of base station 105. First access link 480 may have a corresponding DL pathloss 580 (e.g., a beam formed DL pathloss). Second access link 482 between UE 115 and base station 105 uses UE beam 3 (B3) of UE 115 and a corresponding base station beam of base station 105. Second access link 482 may have a corresponding DL pathloss 582 (e.g., a beam formed DL pathloss). Because access links 480, 482 have different beam forming, they have different corresponding down link path loss. Sidelink 486 between UE 115 and electronic device 415 uses UE beam 1 (B1) of UE 115 and a corresponding device beam of electronic device 415. Sidelink 486 may have a corresponding SL pathloss 586 (e.g., a beam formed SL pathloss), which may correspond to how much a signal attenuates as UE 115 and electronic device 415 use their respective beams to transmit and receive via sidelink 486.

Sidelink open-loop power controller 414 may be configured to determine the sidelink TX power value 406 using a selected one of first access link 480 and second access link

482. Selection of a particular access link from multiple access links may be determined based on a relationship between each access link beam (e.g., B2, B3) of the multiple beams corresponding to multiple access links and a sidelink beam (e.g., B1) corresponding to sidelink 486. For example, beam relationship calculator 413 may determine a relationship between each access link beam of the multiple beams corresponding to multiple access links and sidelink beam corresponding to sidelink 486. In some implementations, the relationship may be a spatial relationship, as described herein. For example, beam relationship calculator 413 may determine the angular spatial relationship between each access link beam and the sidelink beam and may select a particular access link that has an access beam which corresponds to or has the lowest angular spatial relationship value—identify and select which access link is "closest" to sidelink 486 in angular space. In some implementations, an angular spatial relationship value between two links (e.g., two beams) may be determined based on directions of peak gains of the two links (e.g., the two beams).

As shown in FIG. 5, first access link 480 may be determined to be the "closest" to sidelink 486. For example, a first angular spatial relationship value between a first access link beam (B2) of first access link 480 and a sidelink beam (B1) of sidelink 486 may be less than a second angular spatial relationship value between a second access link beam (B3) of second access link 482 and sidelink beam (B1) of sidelink 486. In such a situation, sidelink open-loop power controller 414 calculates sidelink TX power 406 as: SL Tx power=min{target Rx power+DL pathloss, target Rx power+SL pathloss}, where DL pathloss is first DL pathloss 580.

Referring to FIG. 4, in some implementations in which multiple access links, e.g., first access link 480 and second access link 482, are present between UE 115 and base station 105, base station 105 provides an indication 422 (e.g., data or a message) that indicates which access link the sidelink open-loop power controller 414 is to use to determine sidelink TX power value 406. For example, base station 105 (e.g., interference calculator 438) may determine an interference measurement at base station 105 for each access link. Base station 105 may select a particular access link receiving the largest amount of interference from sidelink. Alternatively, base station 105 may select a particular access link that is an active or primary access link used for communication between base station 105 and UE 115. Although use of interference measurements at base station 105 are described, it is noted that UE 115 may also calculate interference measurements at UE 115 of one or more access links and may select a particular access link, as described with reference to base station 105, based on the interference measurements calculated at UE 115.

Figure 6:
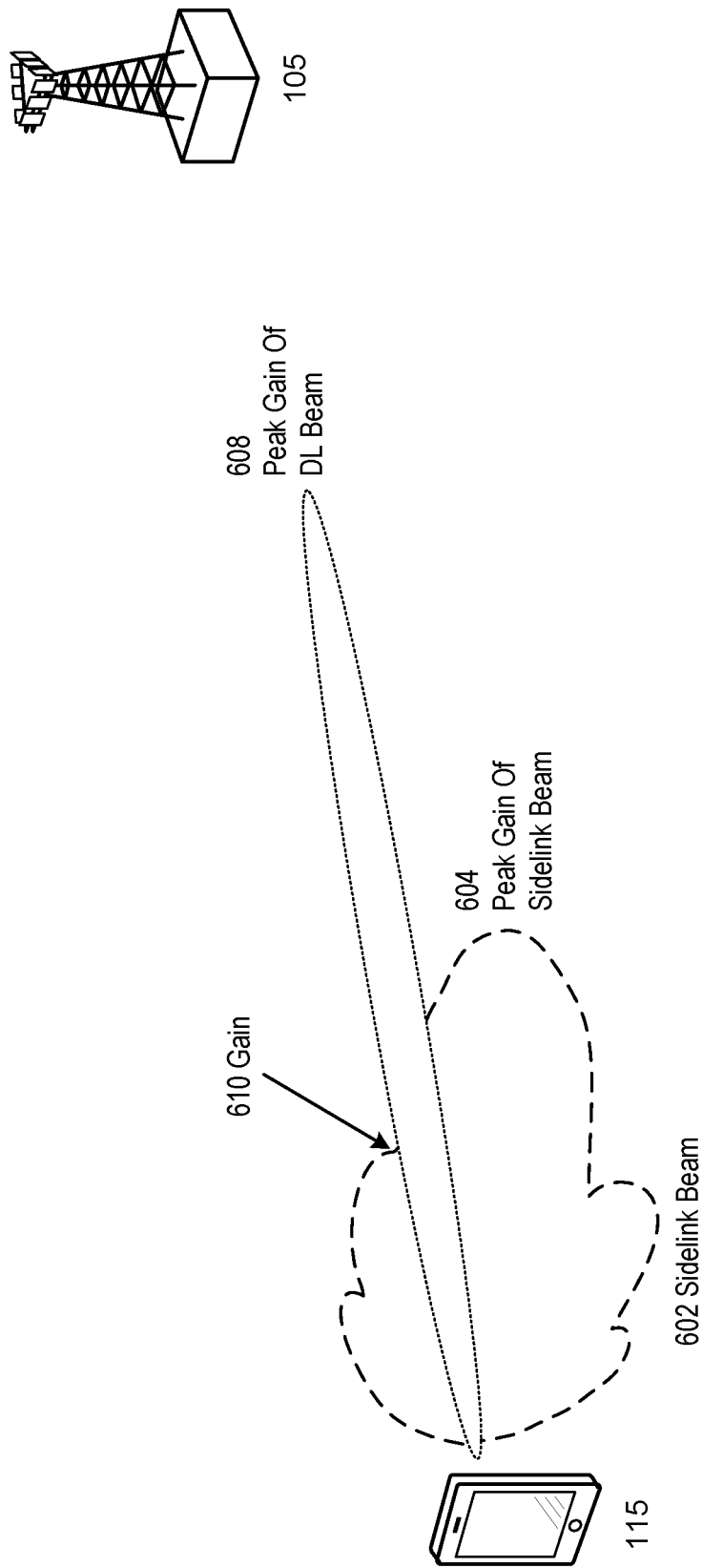
FIG. 6 is a diagram illustrating a wireless communication system including a base stations and a UE.

Referring to FIG. 6, an example of system 400 is shown in which an adjustment amount is used to determine sidelink TX power value 406. This "adjustment amount" (e.g., an adjustment value 433) may correspond to the signal power that would leak from the sidelink beam onto the direction that the access link beam is pointing at, as described herein. As shown in FIG. 6, a sidelink beam 602 (e.g., B1) for sidelink 486, overlaps an access link beam (e.g., B2) for access link 480. The access link beam (e.g., a DL beam) has a peak gain 608 in a first direction (e.g., a first angular position). In some implementations, the adjustment amount may be determined as a difference between peak gain 608 of the access link beam and a gain 610 of the sidelink beam at the direction (e.g., the first direction) of the peak gain 608 of the access link beam. Gain 610 may be determined using beam information 408 and a spatial difference (e.g., an angle) between the first direction and the second direction. If peak gain 604 of sidelink beam 602 is 8 dB, peak gain 608 of the access link beam is 16 dB, and gain 610 of sidelink beam 602 at the second direction is 3 dB, the adjustment amount=peak gain 608−gain 610=16 dB−3 dB=13 dB. The signal beamformed with sidelink beam 602 that propagates in the direction of peak gain 608 would be received 13 dB weaker than the signal beam formed with access link beam propagating in the same direction. Sidelink open-loop power controller 414 may be configured to determine the sidelink TX power value 406 as:

$$SL\ TX\ power = \min\{targetRx\ power + DL\ pathloss + adjustment\ value, targetRx\ power + SL\ pathloss\}.$$

As an illustrative, third example, target Rx power=−80 dBm, DL pathloss=80 dB, SL pathloss=100 dB and the adjustment value=13 dB. It is noted that such values are used herein for illustration and are not intended to be limiting. In the third example, sidelink open-loop power controller 414 calculates sidelink TX power 406 as: SL TX power=min{target Rx power+DL pathloss+"adjustment value", target Rx power+SL pathloss}=min{−80 dBm+80 dB+13 dB, −80 dBm+100 dB}=min{13 dBm, 20 dBm}=13 dBm. When the third example is compared to the second example where SL TX power (e.g., 406) is 0 dBm (using min of two power values), the third example having SL TX power (e.g., 406) of 13 dBm is greater than 0 dBm which means UE 115 can transmit at higher power.

Referring to FIG. 4, in some implementations, base station 105 provides indication 422 (e.g., data or a message) that indicates the adjustment amount to be used by UE 115 to determine sidelink TX power value 406. In some implementations, base station 105 may select the adjustment amount as a predetermined value, such as a default amount. In some implementations, if sidelink 486 and an access link (e.g., 480) are using different beams, base station 105 may select the adjustment amount as a default value, such as a non-zero value. Alternative, if sidelink 486 and an access link (e.g., 480) are using the same beams, base station 105 may select the adjustment amount as zero (or no adjustment).

In some aspects, base station 105 may indicate, or UE 115 may determine, to selectively apply the adjustment amount. For example, base station 105 may indicate for UE 115 to use the adjustment amount for a time period. Alternatively, UE 115 may determine, independent of base station 105, to use the adjustment amount for the time period. In some implementations, base station 105 may indicate an adjustment amount to be used by UE 115 and may subsequently instruction UE 115 to no longer use the adjustment amount, such as when interference measured at base station 105 with respect to an access link is greater than or equal to a threshold. In some aspects, base station 105 may indicate to use the adjustment value 433 (e.g., an adjustment amount) if a particular access link is selected by UE 115 to be used to calculate sidelink TX power value 406. For example, base station 105 may indicate to UE 115 to use the adjustment value if a primary access link is selected or, alternatively, to use the adjustment value if a non-primary access link (e.g., a secondary or back-up access link) selected. In some implementations, indication 422 from base station 105 to UE 115 may indicate which access link to use to calculate sidelink TX power value 406, the adjustment amount to apply, a time period to apply a sidelink TX power value 406, or a combination there.

Thus, FIGS. 4-6 describes sidelink TX power control. For example, the sidelink power control may be used with mmWave, such as when beam forming is used and multiple access links are present between base station 105 and UE 115. The techniques described herein may enable UE 115 to use a higher sidelink TX power as compared to conventional approaches. For example, UE 115 may account for the relationship, such as an angular or radiation pattern relationship, between sidelink 486 (e.g., a sidelink beam) and an access link (e.g., access link beam) to determine the sidelink TX power.

Figure 8:
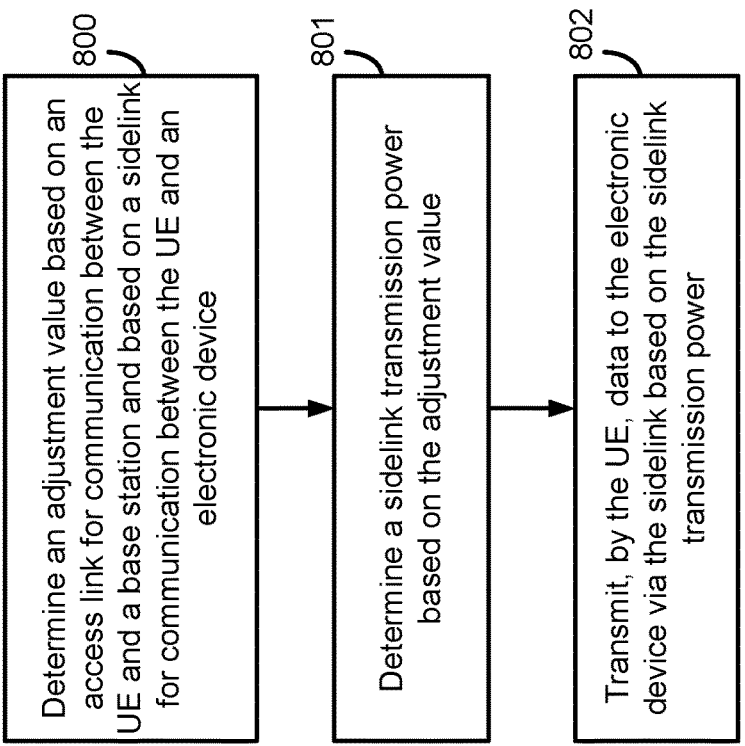
FIG. 8 is a block diagram illustrating example blocks executed by a base station configured according to an aspect of the present disclosure.
Figure 7:
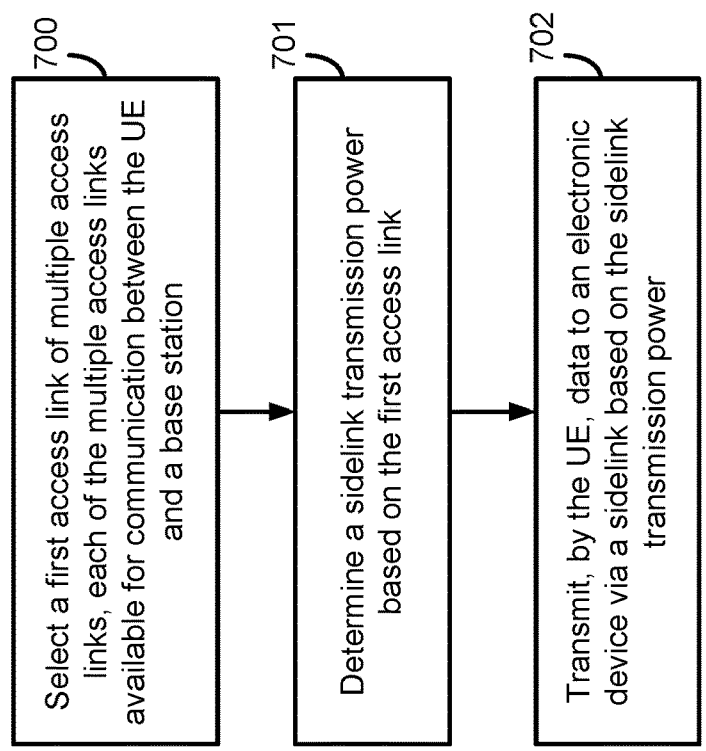
FIG. 7 is a block diagram illustrating example blocks executed by a UE configured according to an aspect of the present disclosure.
Figure 11:
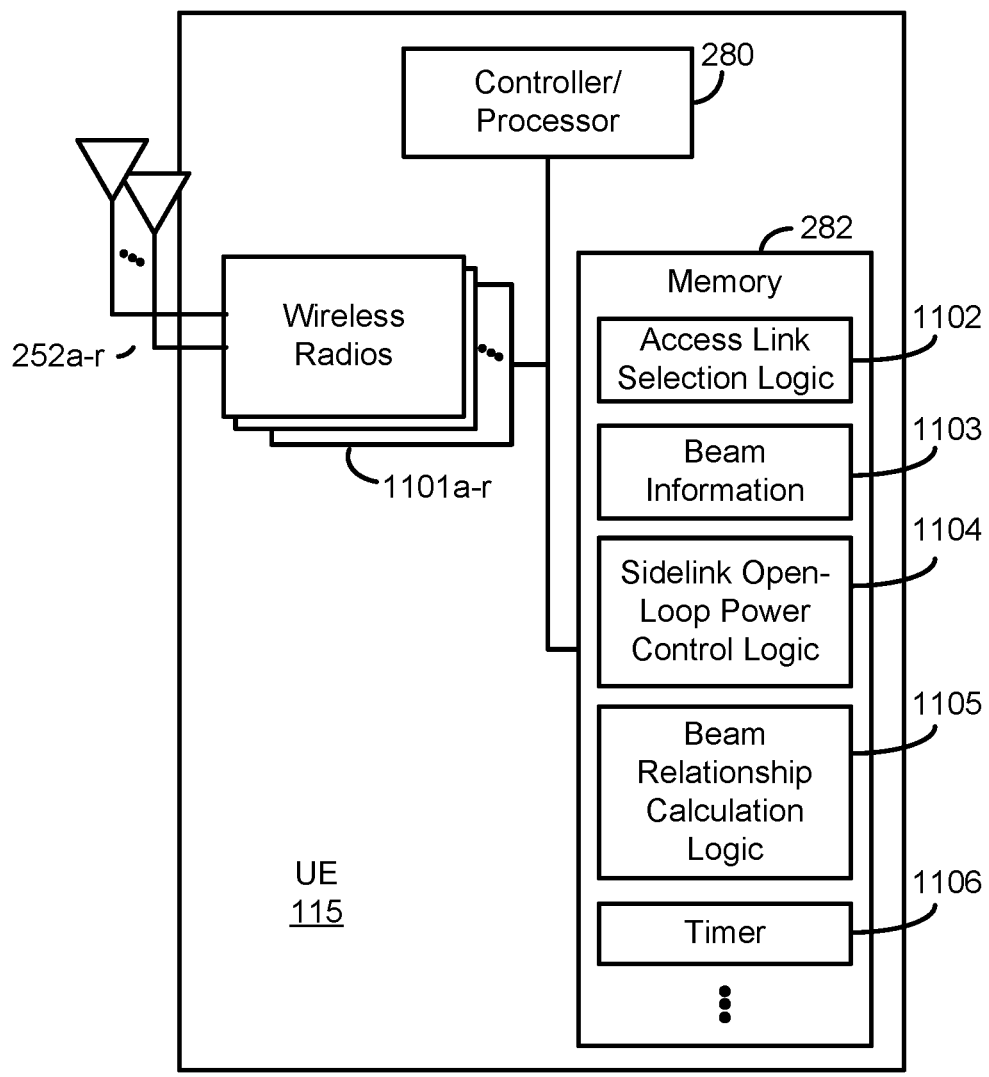
FIG. 11 is a block diagram conceptually illustrating a design of a EU according to some embodiments of the present disclosure.
Figure 12:
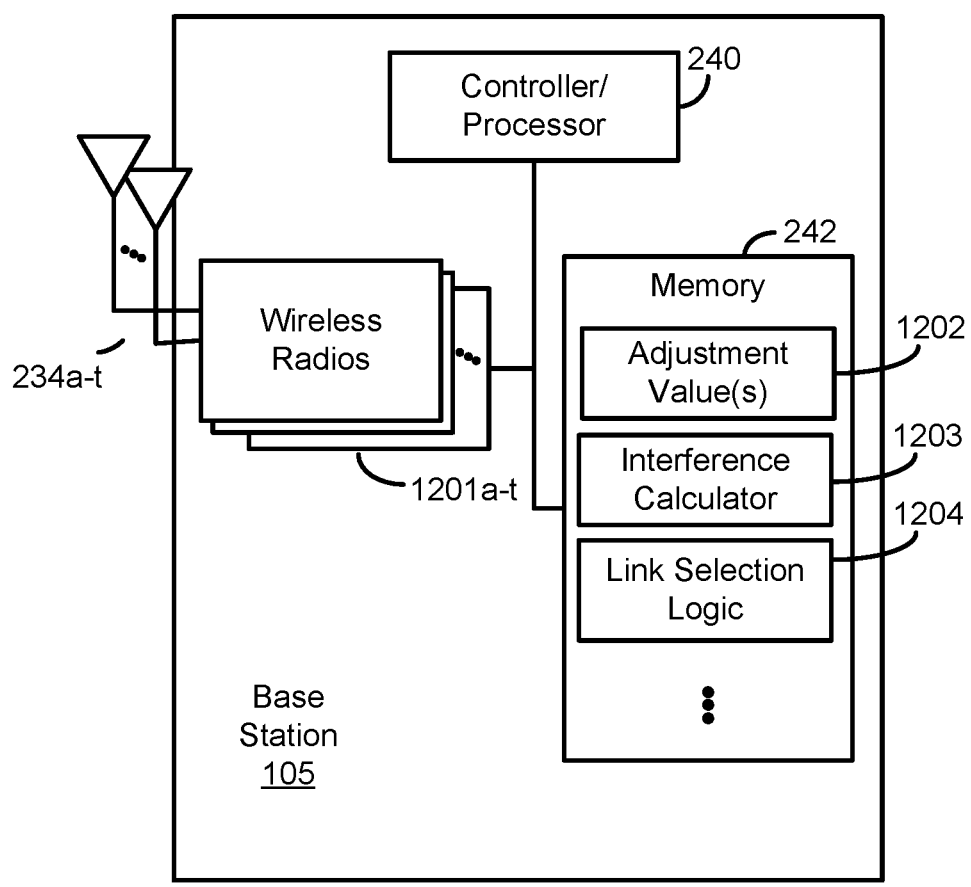
FIG. 12 is a block diagram conceptually illustrating a design of a base station configured according to some embodiments of the present disclosure.

FIGS. 7 and 8 are a block diagrams illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266. As shown, memory 282 may include access link selection logic 1102, beam information 1103, sidelink open-loop power control logic 1104, beam relationship calculation logic 1105, and a timer 1106. Access link selection logic 1102 may include or correspond to processor(s), beam relationship calculator 413, or both. Beam information 1103 may include or correspond to beam information 408. Sidelink open-loop power control logic 1104 may include or correspond to sidelink open-loop power controller 414. Beam relationship calculation logic 1105 may include or correspond to beam relationship calculator 413. UE 115 may receive signals from and/or transmit signal to a base station, such as base station 105 as illustrated in FIG. 12.

Referring to FIG. 7, at block 700, the UE selects a first access link of multiple access links, each of the multiple access links available for communication between the UE and a base station. To illustrate, the multiple access links may include or correspond to access links 480, 482. For example, UE 115 may communicate with base station 105 using the multiple access links via wireless radios 1100a-r and antennas 252a-r. Communication via the multiple access links may be controlled by controller/processor 280. In some implementations, each of the multiple access links may be active and used for communication between the UE and the base station. To illustrate, the multiple access links may include the first access link and a second access link that are concurrently active and used for communication between the UE and the base station.

In some aspects, the first access link is selected based on a relationship between a first access link beam of the first access link and a sidelink beam of the sideline (e.g., 486). For example, UE 115 may execute, under control of controller/processor 240, access link selection logic 1102, stored in memory 282, to select the first access link. UE 115 may communicate with an electronic device (e.g., 415) via the sidelink. The electronic device may include another UE.

In some aspects, the relationship may include or correspond to a relationship parameter (e.g., a spatial relationship parameter, an interference parameter, etc.) or relationship value (e.g., a spatial degree, an amount of interference, etc.). For example, UE 115 may execute, under control of controller/processor 240, beam relationship calculation logic 1105, stored in memory 282, to determine the relationship. Beam relationship calculation logic 1105 may include or correspond to beam relationship calculator 413. The relationship may be based on a radiation pattern of a UE access link beam corresponding to the first access link, a radiation pattern of a sidelink beam corresponding to the sidelink, or both. Additionally, or alternatively, the relationship may be based on a direction of a peak gain of the UE access link beam, a direction of a peak gain of the sidelink beam, or both.

In some aspects, the UE determines which access link of the multiple access links (e.g., multiple UE access link beams) is closest to the sidelink (e.g., a sidelink beam). For example, beam relationship calculation logic 1105 may determining which access link of the multiple access links is closest to the sidelink based on a spatial relationship between each UE access link beam and the sidelink beam. The spatial relationship between two links may be determined using beam information 1103. Beam information may include or correspond to beam information 408. As an example of determining spatial relationships, beam relationship calculation logic 1105 may determine a first value corresponding to a first angular distance between the first UE access link beam of the first access link (e.g., 480) and the sidelink beam of the sidelink (e.g., 486) and may determine a second value corresponding to a second angular distance between a second UE access link beam of a second access link (e.g., 482) of the multiple UE beams corresponding to multiple access links and the sidelink beam corresponding to the sidelink (e.g., 486). In a particular implementation, the first value is determined based on a first direction of a peak gain of a first UE access link beam corresponding to the first access link and based on a second direction of a peak gain of a sidelink beam corresponding to the sidelink. Additionally, or alternatively, the second value may be determined based on a third direction of a peak gain of a second UE access link beam corresponding to the second access link and based on the second direction of the peak gain of the sidelink beam.

Beam relationship calculation logic 1105, access link selection logic 1102, or both, may select the closest link to the sidelink based on one or more comparisons. For example, beam relationship calculation logic 1105, access link selection logic 1102, or both, may determine whether the first value is less than the second value. If the first value is less than the second value, then the first access link may be determined to be closer to the sidelink than the second access link is to the sidelink.

At block 701, the UE determines a sidelink transmission power based on the first access link. For example, UE 115 may execute, under control of controller/processor 240, sidelink open-loop power control logic 1104, stored in memory 282 to determine the sidelink transmission power. Sidelink open-loop power control logic 1104 may include or correspond to sidelink open-loop power controller 414. Sidelink open-loop power control logic 1104 may determine the sidelink transmission power based on the first access link (e.g., the selected access link). Additionally, or alternatively, sidelink open-loop power control logic 1104 may not determine the sidelink transmission power based on a non-selected access link of the multiple access links.

In some aspects, determining the sidelink transmission power (e.g., 406) includes performing sidelink open-loop power control. As an illustrative, non-limiting example, determining the sidelink transmission power may include determining a first candidate value based on a target receive power (e.g, target RX power) and a downlink (DL) pathloss (e.g., 580), determining a second candidate value based on the target receive power and a sidelink pathloss (e.g., 586), and selecting the minimum of the first candidate value and the second candidate value as the sidelink transmission power (e.g., 406). In such implementations, sidelink open-loop power control logic 1104 may be configured to determine the DL pathloss, which may include a DL beam formed pathloss, and determine the sidelink pathloss, which may include a sidelink beam formed path loss.

At block 702, the UE transmits data to an electronic device via a sidelink based on the sidelink transmission power. For example, UE 115 may communicate with the electronic device, such as electronic device 415, using a sidelink via wireless radios 1100*a-r* and antennas 252*a-r*. Communication via the sidelink may be controlled by controller/processor 280.

In some aspects, UE may receive, from the base station 105, an indication of the first access link. In such implementations, access link selection logic 1102 may select the first access link in response to the indication. Additionally, or alternatively, UE may receive, from the base station 105, an indication of an adjustment value. In such implementations, the sidelink transmission power (e.g., 406) may be determined based on the adjustment value.

Referring to FIG. 8, at block 800, the UE determines an adjustment value based on an access link for communication between the UE and a base station and based on a sidelink for communication between the UE and an electronic device. The electronic device (e.g., 415) may include another UE. For example, UE 115 may communicate with the electronic device, such as electronic device 415, using a sidelink via wireless radios 1100*a-r* and antennas 252*a-r*. Communication via the sidelink may be controlled by controller/processor 280. In some aspects, UE 115 may receive an indication of the adjustment value from the base station.

In some aspects, UE 115 may execute, under control of controller/processor 240, beam relationship calculation logic 1105, stored in memory 282, to determine the adjustment value. The adjustment value may be determined based on a relationship between the access link and the sidelink. As an illustrative, non-limiting example, the relationship includes a spatial relationship between the access link (e.g., 480), which corresponds to a UE access link beam having a peak gain (e.g., 608), and the sidelink (e.g., 486), which corresponds to a sidelink beam having a peak gain (e.g., 604). The beam relationship calculation logic 1105 may determine a gain (e.g., 610) of the sidelink beam at a direction of the peak gain of the access link beam. For example, the beam relationship calculation logic 1105 may use beam information 1103, such as beam pattern information, to perform one or more calculations to determine the gain (e.g., 610). The adjustment value corresponds to a difference between a peak gain of the access link beam and the gain of the sidelink beam at the direction of the peak gain of the access link beam.

At block 801, the UE determines a sidelink transmission power based on the adjustment value. For example, UE 115 may execute, under control of controller/processor 240, sidelink open-loop power control logic 1104, stored in memory 282 to determine the sidelink transmission power (e.g., 406). Sidelink open-loop power control logic 1104 may include or correspond to sidelink open-loop power controller 414. Sidelink open-loop power control logic 1104 may perform sidelink open-loop side link power control based on the adjustment value. In some implementations, to determine the sidelink transmission power, sidelink open-loop power control logic 1104 may determine a first candidate value based on target receive power, a downlink (DL) pathloss, and the adjustment value, determining a second candidate value based on the target receive power and a sidelink pathloss. Sidelink open-loop power control logic 1104 may select the minimum of the first candidate value and the second candidate value as the sidelink transmission power. In such implementations, sidelink open-loop power control logic 1104 or beam relationship calculation logic 1105 may determine the DL pathloss, which includes a DL beam formed pathloss, and determine the sidelink pathloss, which includes a sidelink beam formed path loss.

At block 802, the UE transmits data to the electronic device via the sidelink based on the sidelink transmission power. For example, UE 115 may communicate with the electronic device, such as electronic device 415, using a sidelink via wireless radios 1100*a-r* and antennas 252*a-r*. Communication via the sidelink may be controlled by controller/processor 280.

In some aspects, UE 115 may determine a third candidate value based on target receive power and the downlink (DL) pathloss. In such implementations, if the third candidate value is less than the selected minimum, UE 115 may adjust the sidelink transmission power to the third candidate value. For example, the UE 115 may adjust the sidelink transmission power to the third candidate value in response to notification from the base station that interference on an access link from the sidelink transmission is greater than or equal to a threshold.

It is noted that one or more blocks (or operations) described with reference to one of FIGS. 7-8 may be combined with one or more blocks (or operations) of another of FIGS. 7-8. For example, one or more blocks of FIG. 700 may be combined with one or more blocks of FIG. 8. Additionally, or alternatively, one or more operations described above with reference to FIGS. 1-6 may be combine with one or more operations described with reference to FIG. 7, FIG. 8, or a combination of FIGS. 7 and 8.

Figure 10:
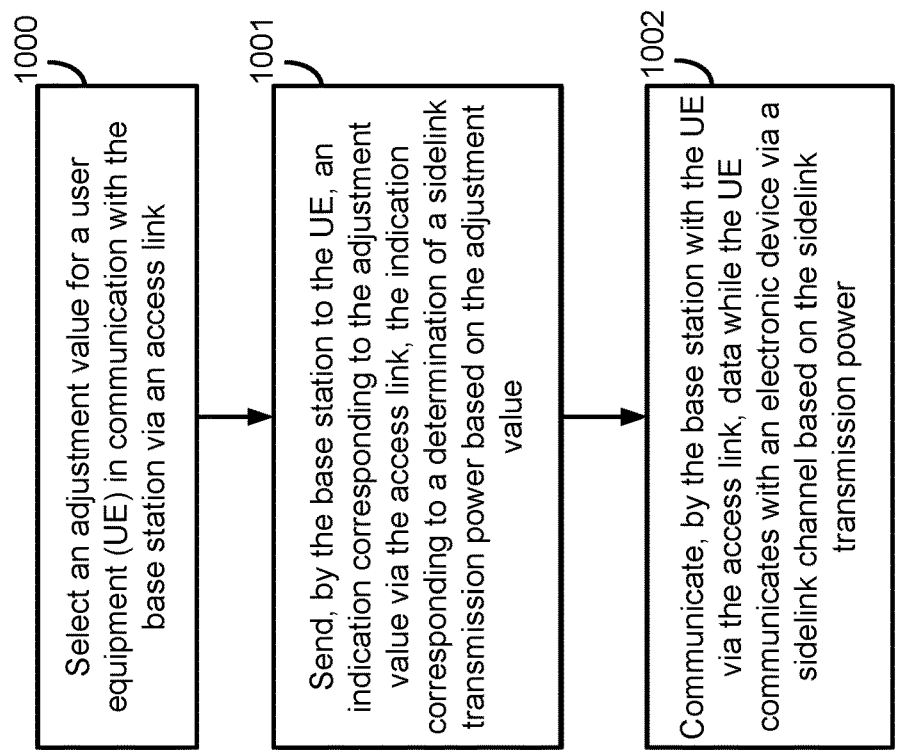
FIG. 10 is a block diagram illustrating example blocks executed by a base station configured according to an aspect of the present disclosure.
Figure 9:
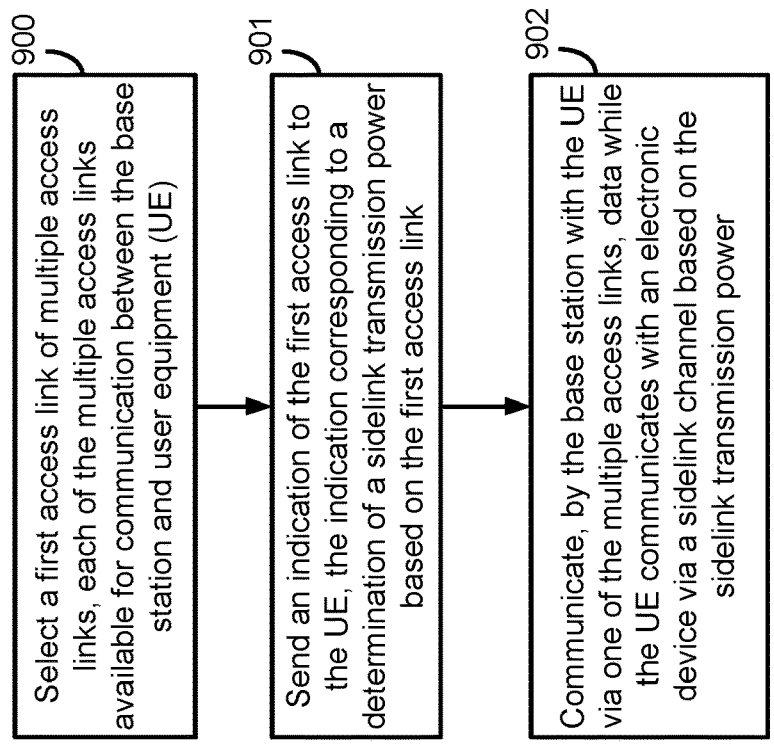
FIG. 9 is a block diagram illustrating example blocks executed by a UE configured according to an aspect of the present disclosure.

FIGS. 9 and 10 are a block diagrams illustrating example blocks executed by a base station configured according to an aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1200*a-t* and antennas 234*a-t*. Wireless radios 1200*a-t* includes various components and hardware, as illustrated in FIG. 2 for base station 105, including modulator/demodulators 232*a-t*, transmit processor 220, TX MIMO processor 230, MIMO detector 236, and receive processor 238. As shown, memory 242 may include one or more adjustment values 1202, interference calculator 1203, and link selection logic 1204. The one or more adjustment values 1202 may include or correspond to the one or more adjustment values 433. Interference calculator 1203 may include or correspond to interference calculator 438. Link selection logic 1204 may include or correspond to processor(s) 430. Base station 105 may receive signals from and/or transmit signal to a UE, such as UE 115 as illustrated in FIG. 11.

Referring to FIG. 9, at block 900, the base station selects a first access link of multiple access links, each of the multiple access links available for communication between the base station and user equipment (UE). For example, base station 105 may execute, under control of controller/processor 240, link selection logic 1204, stored in memory 242 to select the first access link (e.g., 480). In some implementations, link selection logic 1204 may select the first access link based on a determination that the first access link being designated as a primary access link (of multiple access links). In some implementations, each of the multiple access links may be active and used for communication between the UE and the base station. To illustrate, the multiple access links may include the first access link and a second access link that are concurrently active and used for communication between the UE and the base station.

In some aspects, the first access link is selected based on interference corresponding to the first access link. For example, base station 105 may execute, under control of controller/processor 240, interference calculator 1203, stored in memory 242 to determine, for each of one or more access links, interference corresponding to the access link. To illustrate, interference calculator 1203 may be configured to determine a first interference value corresponding to the first access link and determine a second interference value corresponding to a second access link of the multiple access links. Link selection logic 1204 may be configured to perform a comparison between the first interference value and the second interference value. For example, link selection logic 1204 may select the first access link based on the first interference value being larger than the second interference value.

At block 901, the base station sends an indication of the first access link to the UE, the indication corresponding to a determination of a sidelink transmission power based on the first access link. For example, base station 105 may communicate with UE 115 using an access link via wireless radios 1200a-r and antennas 234a-r. Communication via the access link may be controlled by controller/processor 240. In some aspects, the indication further includes an adjustment value to be applied by the UE to determine the sidelink transmission power (e.g., 406).

At block 902, the base station communicates, via one of the multiple access links with the UE, data while the UE communicates with an electronic device via a sidelink channel based on the sidelink transmission power. For example, UE 115 may communicate with the electronic device, such as electronic device (e.g., 415), using a sidelink via wireless radios 1100a-r and antennas 252a-r.

Referring to FIG. 10, at block 1000, the base station selects an adjustment value for a user equipment (UE) in communication with the base station via an access link. For example, base station 105 may execute, under control of controller/processor 240, link selection logic 1204, stored in memory 242 to select the adjustment value from the one or more adjustment values 1202 (e.g., 406). In some aspects, the adjustment value is a predetermined value, such as 1 dB, 2 dB, 3 dB, 5 dB, 10 dB, or another value. Additionally, or alternatively, the adjustment value may be determined based on an interference amount corresponding the access link. For example, base station 105 may execute, under control of controller/processor 240, interference calculator, stored in memory 242 to determine the interference amount. In some implementations, link selection logic 1204 may select a default value based on the interference amount. For example, base station 105 may select a closest predetermined value to the interference value.

At block 1001, the base station sends, to the UE, an indication corresponding to the adjustment value via the access link, the indication corresponding to a determination of a sidelink transmission power based on the adjustment value. UE may perform sidelink open-link power control based on the adjustment value. For example, UE 115 may execute, under control of controller/processor 240, sidelink open-loop power control logic 1104, stored in memory 282 to perform sidelink open-link power control based on the adjustment value. To illustrate, UE 115 (e.g., sidelink open-loop power control logic 1104) may determine a first candidate value based on a target receive power, a downlink (DL) pathloss, and the adjustment value, and determine a second candidate value based on the target receive power and the downlink (DL) pathloss.

In some aspects, the indication instructs the UE to use the first candidate value for a time period. UE 115 may use the first candidate value for the time period based on timer 1106. For example, UE 115 may execute, under control of controller/processor 240, timer 1106, stored in memory 282 to use the first candidate value for the time period.

At block 1002, the base station communicates, via the access link with the UE, data while the UE communicates with an electronic device via a sidelink channel based on the sidelink transmission power. For example, UE 115 may communicate with the electronic device, such as electronic device (e.g., 415), using a sidelink via wireless radios 1100a-r and antennas 252a-r.

In some aspects, base station receives a request from the UE to provide the adjustment value. Additionally, or alternatively, the indication (e.g., 422) identifies a first access link of multiple access links to which the adjustment value is to be applied, each of the multiple access links for communication between the UE and the base station. In some implementations, after sending the indication, base station may send another indication to the UE to instruct the UE to not use the adjustment value to determine the sidelink transmission power. In some implementations, the other indication may instruct the UE to use the second candidate value, such as the second candidate value based on the target receive power and the downlink (DL) pathloss—which is not determine based on the adjustment value.

It is noted that one or more blocks (or operations) described with reference to one of FIGS. 9-10 may be combined with one or more blocks (or operations) of another of FIGS. 9-10. For example, one or more blocks of FIG. 900 may be combined with one or more blocks of FIG. 10. Additionally, or alternatively, one or more operations described above with reference to FIGS. 1-6 may be combine with one or more operations described with reference to FIG. 9, FIG. 10, or a combination of FIGS. 9 and 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 4) may include processors, electronics devices, hardware devices, electronics components, logical circuits, memories, software codes, firmware codes, etc., or any combination thereof.

The functional blocks and modules in FIGS. 7-10 may include processors, electronics devices, hardware devices, electronics components, logical circuits, memories, software codes, firmware codes, etc., or any combination thereof.

Although FIGS. 4-12 have been described with reference to a sidelink between UE 115 and an electronic device (e.g., another UE), it is noted that in other the sidelink may be amongst integrated access and backhaul (IAB) nodes (e.g., a first IAB node and a second IAB node). For example, the firs IAB node may be configured to be coupled to base station 105 via one or more access links. Accordingly, operations and/or components described with reference to UE 115 in FIGS. 1-12 are to be understood as being performed by and/or incorporated into an IAB node.

In some aspects, techniques for enabling sidelink communication may include additional aspects, such as any single aspect or any combination of aspects described below or in connection with one or more other processes or devices described elsewhere herein. In some aspects, enabling sidelink communication may include an apparatus determining an adjustment value based on an access link for communication between the UE and a base station and based on a sidelink for communication between the UE and an electronic device; determining a sidelink transmission power based on the adjustment value; and transmitting data to the electronic device via the sidelink based on the sidelink transmission power. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the adjustment value is further determined based on a relationship between the access link and the sidelink.

In a second aspect, alone or in combination with the first aspect, the relationship includes a spatial relationship between the access link and the sidelink.

In a third aspect, alone or in combination with one or more of the first through second aspects, the access link corresponds to a UE access link beam having a peak gain, and sidelink corresponds to a sidelink beam having a peak gain.

In a fourth aspect, alone or in combination with the third aspect, the apparatus determines a gain of the sidelink beam at a direction of the peak gain of the UE access link beam.

In a fifth aspect, alone or in combination with one or more of the first through fourth aspects, the apparatus performs sidelink open-loop side link power control based on the adjustment value.

In a sixth aspect, alone or in combination with one or more of the first through fourth aspects, the apparatus determines a first candidate value based on target receive power, a downlink (DL) pathloss, and adjustment value.

In a seventh aspect, alone or in combination with sixth aspect, the apparatus determines a second candidate value based on target receive power and a sidelink pathloss.

In an eighth aspect, alone or in combination with one or more of the sixth through seventh aspects, the apparatus selects the minimum of the first candidate value and the second candidate value as the sidelink transmission power.

In a ninth aspect, alone or in combination with the eighth aspect, the apparatus determines the DL pathloss, and where the DL pathloss includes a DL beam formed pathloss.

In a tenth aspect, alone or in combination with one or more of the eighth through ninth aspects, the apparatus determines the sidelink pathloss, where the sidelink pathloss includes a sidelink beam formed path loss.

In an eleventh aspect, alone or in combination with the eighth aspect, the apparatus determines a third candidate value based on target receive power and downlink (DL) pathloss.

In a twelfth aspect, alone or in combination with the eleventh aspect, if the third candidate value is less than the selected minimum, the apparatus adjusts the sidelink transmission power to the third candidate value.

In a thirteenth aspect, alone or in combination with one or more of the first through twelfth aspects, the apparatus uses each of multiple concurrent access links for communication between the apparatus and the base station.

In a fourteenth aspect, alone or in combination with one or more of the first through thirteenth aspects, the electronic device includes a UE.

In a fifteenth aspect, alone or in combination with one or more of the first through fourteenth aspects, the apparatus receives an indication of the adjustment value from the base station.

In some aspects, an apparatus configured for wireless communication, such as a UE, is configured to select a first access link of multiple access links, each of the multiple access links available for communication between the UE and a base station; determine a sidelink transmission power based on the first access link; and transmit data to an electronic device via a sidelink based on the sidelink transmission power. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a sixteenth aspect, the first access link is selected based on a relationship between the first access link and the sidelink.

In a seventeenth aspect, alone or in combination with one or more of the sixteenth through sixteenth aspects, the relationship is based on a radiation pattern of a UE access link beam corresponding to the first access link, a radiation pattern of a sidelink beam corresponding to the sidelink, or both.

In an eighteenth aspect, alone or in combination with the seventeenth aspect, the relationship is further based on a direction of a peak gain of the UE access link beam, a direction of a peak gain of the sidelink beam, or both.

In a nineteenth aspect, alone or in combination with one or more of the sixteenth through eighteenth aspects, the apparatus is further configured to determine which access link of the multiple access links is closest to the sidelink.

In a twentieth aspect, alone or in combination with the nineteenth aspect, the apparatus is further configured to determine which access link of the multiple access links is closest to the sidelink is determined based on a spatial relationship between each access link and the sidelink.

In a twenty-first aspect, alone or in combination with the twentieth aspect, the apparatus is further configured to determine a first value corresponding to a first angular distance between the first access link and the sidelink.

In a twenty-second aspect, alone or in combination with the twenty-first aspect, the apparatus is further configured to a second value corresponding to a second angular distance between a second access link of the multiple access links and the sidelink.

In a twenty-third aspect, alone or in combination with the twenty-second aspect, the apparatus is further configured to whether the first value is less than the second value.

In a twenty-fourth aspect, alone or in combination with the twenty-third aspect, the first value is determined based on a first direction of a peak gain of a first UE access link beam corresponding to the first access link and based on a second direction of a peak gain of a sidelink beam corresponding to the sidelink.

In a twenty-fifth aspect, alone or in combination with the twenty-fourth aspect, the second value is determined based on a third direction of a peak gain of a second UE access link beam corresponding to the second access link and based on the second direction of the peak gain of the sidelink beam.

In a twenty-sixth aspect, alone or in combination with one or more of the sixteenth through twenty-fifth aspects, the apparatus is further configured to determine the sidelink transmission power by performing sidelink open-loop power control.

In a twenty-seventh aspect, alone or in combination with one or more of the sixteenth through twenty-sixth aspects, to determine the sidelink transmission power, the apparatus is configured to determine a first candidate value based on a target receive power and a downlink (DL) pathloss.

In a twenty-eighth aspect, alone or in combination with the twenty-seventh aspect, to determine the sidelink transmission power, the apparatus is configured to determine a second candidate value based on the target receive power and a sidelink pathloss.

In a twenty-ninth aspect, alone or in combination with the twenty-eighth aspect, to determine the sidelink transmission power, the apparatus is configured to select the minimum of the first candidate value and the second candidate value as the sidelink transmission power In a thirtieth aspect, alone or in combination with the twenty-ninth aspect, the apparatus is further configured to determine the DL pathloss.

In a thirty-first aspect, alone or in combination with the thirtieth aspect, the DL pathloss includes a DL beam formed pathloss.

In a thirty-second aspect alone or in combination with one or more of the thirtieth through thirty-first aspects, the apparatus is further configured to determine the sidelink pathloss.

In a thirty-third aspect alone or in combination with the thirty-second aspect, the sidelink pathloss includes a sidelink beam formed path loss.

In a thirty-fourth aspect alone or in combination with one or more of the sixteenth through thirty-fourth aspects, the apparatus is further configured to use each of the multiple access links for communication between the UE and the base station.

In a thirty-fifth aspect, alone or in combination with the thirty-third aspect, the first access link is selected responsive to the indication.

In a thirty-sixth aspect, alone or in combination with one or more of the sixteenth through thirty-fifth aspects, the apparatus is further configured to receive, from the base station, an indication of an adjustment value.

In a thirty-seventh aspect alone or in combination with the thirty-sixth aspect, the sidelink transmission power is determined based on the adjustment value.

In a thirty-eighth aspect, alone or in combination with one or more of the sixteenth through thirty-seventh aspects, the apparatus is further configured to determine an adjustment value based on an access link for communication between the UE and a base station and based on a sidelink for communication between the UE and an electronic device.

In a thirty-ninth aspect, alone or in combination with the thirty-eighth aspect, the UE is further configured to determine the sidelink transmission power based on the adjustment value.

In a fortieth aspect, alone or in combination with the thirty-eighth aspect, the UE is further configured to determine a second transmission power based on the adjustment value; and transmit data to the electronic device via the sidelink based on the second sidelink transmission power.

In a forty-first aspect, alone or in combination with one or more of the thirty-eighth through fortieth aspects, the adjustment value is further determined based on a relationship between the access link and the sidelink.

In a forty-second aspect alone or in combination with the forty-first aspect, the relationship includes a spatial relationship between the access link and the sidelink.

In a forty-third aspect alone or in combination with one or more of the thirty-eighth through forty-second aspects, the access link corresponds to a UE access link beam having a peak gain, and sidelink corresponds to a sidelink beam having a peak gain.

In a forty-fourth aspect alone or in combination with the forty-third aspect, the apparatus is further configured to determine a gain of the sidelink beam at a direction of the peak gain of the UE access link beam.

In a forty-fifth aspect, alone or in combination with the forty-fourth aspect, the adjustment value corresponds to a difference between a peak gain of the UE access link beam and the gain of the sidelink beam at the direction of the peak gain of the UE access link beam.

In a forty-sixth aspect, alone or in combination with one or more of the sixteenth through forty-fifth aspects, the apparatus is further configured to perform sidelink open-loop side link power control based on the adjustment value.

In a forty-seventh aspect alone or in combination with one or more of the sixteenth through forty-sixth aspects, the apparatus is further configured to determine a first candidate value based on target receive power, a downlink (DL) pathloss, and adjustment value; determine a second candidate value based on target receive power and a sidelink pathloss; and select the minimum of the first candidate value and the second candidate value as the sidelink transmission power.

In a forty-eighth aspect, alone or in combination with the forty-seventh aspect, the apparatus is further configured to determine the DL pathloss, the DL pathloss includes a DL beam formed pathloss; and determine the sidelink pathloss, the sidelink pathloss includes a sidelink beam formed path loss.

In a forty-ninth aspect, alone or in combination with the forty-seventh aspect, the apparatus is further configured to determine a third candidate value based on target receive power and downlink (DL) pathloss; and if the third candidate value is less than the selected minimum, adjust the sidelink transmission power to the third candidate value.

In a fiftieth aspect, alone or in combination with one or more of the thirty-eighth through forty-ninth aspects, the apparatus is further configured to use each of multiple concurrent access links for communication between the UE and the base station.

In a fifty-first aspect, alone or in combination with the fiftieth aspect, the electronic device includes a UE distinct from the apparatus.

In a fifty-second aspect alone or in combination with one or more of the thirty-eighth through fifty-first aspects, the apparatus is further configured to receive an indication of the adjustment value from the base station.

In some aspects, an apparatus configured for wireless communication, such as a base station, is configured to select a first access link of multiple access links, each of the multiple access links available for communication between the base station and user equipment (UE). The apparatus is also configured to send an indication of the first access link to the UE, the indication corresponding to a determination of a sidelink transmission power based on the first access link. The apparatus is further configured to communicate, with the UE via one of the multiple access links, data while the UE communicates with an electronic device via a sidelink channel based on the sidelink transmission power. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a fifty-third aspect, the first access link is selected based on interference corresponding to the first access link.

In a fifty-fourth aspect alone or in combination with one or more of the fifty-third through fifty-third aspects, the apparatus is further configured to determine a first interference value corresponding to the first access link; and determine a second interference value corresponding to a second access link of the multiple access links.

In a fifty-fifth aspect, alone or in combination with the fifty-fourth aspect, the apparatus is further configured to perform a comparison between the first interference value and the second interference value.

In a fifty-sixth aspect, alone or in combination with the fifty-fifth aspect, the first access link is selected based on the first interference value being greater than the second interference value.

In a fifty-seventh aspect alone or in combination with one or more of the fifty-third through fifty-sixth aspects, the first access link is selected based on the first access link being designated as a primary access link.

In a fifty-eighth aspect, alone or in combination with one or more of the first through fifty-seventh aspects, the indication further includes an adjustment value to be applied by the UE to determine the sidelink transmission power.

In some aspects, an apparatus configured for wireless communication, such as a base station, is configured to select an adjustment value for a user equipment (UE) in communication with the base station via an access link; and send, to the UE, an indication corresponding to the adjustment value via the access link, the indication corresponding to a determination of a sidelink transmission power based on the adjustment value. The apparatus is also configured to communicate, with the UE via the access link, data while the UE communicates with an electronic device via a sidelink channel based on the sidelink transmission power. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a fifty-ninth aspect, the adjustment value is a predetermined value.

In a sixtieth aspect, the adjustment value determined based on an amount of interference on the access link by the sidelink.

In a sixty-first aspect, alone or in combination with one or more of the fifty-ninth through sixtieth aspects, the UE is configured to perform sidelink open-link power control based on the adjustment value.

In a sixty-second aspect, alone or in combination with one or more of the fifty-ninth through sixty-first aspects, the UE is configured to determine a first candidate value based on a target receive power, a downlink (DL) pathloss, and the adjustment value.

In a sixty-third aspect, alone or in combination with the sixty-second aspect, the UE is configured to determine a second candidate value based on the target receive power and the downlink (DL) pathloss.

In a sixty-fourth aspect, alone or in combination with the sixty-third aspect, the indication instructs the UE to use the first candidate value for a time period.

In a sixty-fifth aspect, alone or in combination with the sixty-third aspect, the apparatus is further configured to send another indication to the UE to instruct the UE to use the second candidate value.

In a sixty-sixth aspect, alone or in combination with one or more of the fifty-ninth through sixty-fifth aspects, the apparatus is further configured to receive a request from the UE to provide the adjustment value.

In a sixty-seventh aspect alone or in combination with one or more of the fifty-ninth through sixty-sixth aspects, the apparatus is further configured to, after sending the indication, send another indication to the UE to instruct the UE to not use the adjustment value to determine the sidelink transmission power.

In a sixty-eighth aspect, alone or in combination with one or more of the fifty-ninth through sixty-seventh aspects, the indication identifies a first access link of multiple access links to which the adjustment value is to be applied, each of the multiple access links for communication between the UE and the base station.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured for wireless communication, the apparatus comprising:
   at least one processor; and
   a memory coupled to the at least one processor,
   wherein the at least one processor is configured to:
      select, by a user equipment (UE), a first access link of multiple access links, each of the multiple access links available for communication between the UE and a base station;
      determine, by the UE, a sidelink transmission power based on the first access link; and
      transmit, by the UE, data to an electronic device via a sidelink based on the sidelink transmission power.

2. The apparatus of claim 1, wherein the first access link is selected based on a relationship between the first access link and the sidelink.

3. The apparatus of claim 2, wherein the relationship is based on a radiation pattern of a UE access link beam corresponding to the first access link, a radiation pattern of a sidelink beam corresponding to the sidelink, or both.

4. The apparatus of claim 3, wherein the relationship is further based on a direction of a peak gain of the UE access link beam, a direction of a peak gain of the sidelink beam, or both.

5. The apparatus of claim 1, wherein the at least one processor is further configured to determine which access link of the multiple access links is closest to the sidelink.

6. The apparatus of claim 5, wherein determining which access link of the multiple access links is closest to the sidelink is determined based on a spatial relationship between each access link and the sidelink.

7. The apparatus of claim 1, wherein
the at least one processor is further configured to determine, by the UE, an adjustment value based on the first access link for communication between the UE and the base station and based on the sidelink for communication between the UE and the electronic device, and
the sidelink transmission power is further determined based on the adjustment value.

8. The apparatus of claim 7, wherein the adjustment value is further determined based on a relationship between the first access link and the sidelink.

9. The apparatus of claim 8, wherein the relationship comprises a spatial relationship between the first access link and the sidelink.

10. The apparatus of claim 7, wherein the first access link corresponds to a UE access link beam having a first peak gain, and the sidelink corresponds to a sidelink beam having a second peak gain.

11. The apparatus of claim 10, wherein the at least one processor is further configured to determine a gain of the sidelink beam at a direction of the first peak gain of the UE access link beam.

12. The apparatus of claim 11, wherein the adjustment value corresponds to a difference between the first peak gain of the UE access link beam and the gain of the sidelink beam at the direction of the first peak gain of the UE access link beam.

13. The apparatus of claim 7, wherein the at least one processor is configured to perform sidelink open-loop side link power control based on the adjustment value.

14. A method of wireless communication, comprising:
selecting, by a user equipment (UE), a first access link of multiple access links, each of the multiple access links available for communication between the UE and a base station;
determining, by the UE, a sidelink transmission power based on the first access link; and
transmitting, by the UE, data to an electronic device via a sidelink based on the sidelink transmission power.

15. The method of claim 14, further comprising:
determining a first value corresponding to a first angular distance between the first access link and the sidelink;
determining a second value corresponding to a second angular distance between a second access link of the multiple access links and the sidelink; and
determining whether the first value is less than the second value.

16. The method of claim 15, wherein:
the first value is determined based on a first direction of a peak gain of a first UE access link beam corresponding to the first access link and based on a second direction of a peak gain of a sidelink beam corresponding to the sidelink; and
the second value is determined based on a third direction of a peak gain of a second UE access link beam corresponding to the second access link and based on the second direction of the peak gain of the sidelink beam.

17. The method of claim 14, wherein determining the sidelink transmission power comprises performing sidelink open-loop power control.

18. The method of claim 14, wherein determining the sidelink transmission power comprises:
determining a first candidate value based on a target receive power and a downlink (DL) path loss;
determining a second candidate value based on the target receive power and a sidelink pathloss; and
selecting the minimum of the first candidate value and the second candidate value as the sidelink transmission power.

19. The method of claim 18, further comprising:
determining the DL pathloss, the DL pathloss comprises a DL beam formed pathloss; and
determining the sidelink pathloss, the sidelink pathloss comprises a sidelink beam formed path loss.

20. The method of claim 14, further comprising:
using each of the multiple access links for communication between the UE and the base station; and
wherein the electronic device comprises another UE.

21. The method of claim 14, further comprising:
receiving, from the base station, an indication of the first access link; and
wherein the first access link is selected responsive to the indication.

22. The method of claim 14, further comprising:
receiving, from the base station, an indication of an adjustment value; and
wherein the sidelink transmission power is determined based on the adjustment value.

23. An apparatus configured for wireless communication, the apparatus comprising:
at least one processor; and
a memory coupled to the at least one processor,
wherein the at least one processor is configured to:
determine, by a user equipment (UE), an adjustment value based on an access link for communication between the UE and a base station and based on a sidelink for communication between the UE and an electronic device;
determine, by the UE, a sidelink transmission power based on the adjustment value; and
transmit, by the UE, data to the electronic device via the sidelink based on the sidelink transmission power.

24. The method of claim 14, further comprising:
determining, by the UE, an adjustment value; and
wherein the sidelink transmission power is further determined based on the adjustment value.

25. The method of claim 24, further comprising:
determining a first candidate value based on a target receive power, a downlink (DL) pathloss associated with the first access link, and the adjustment value;
determining a second candidate value based on the target receive power and a sidelink pathloss; and
selecting the minimum of the first candidate value and the second candidate value as the sidelink transmission power.

26. The method of claim 25, further comprising:
determining the DL pathloss, the DL pathloss comprises a DL beam formed pathloss; and
determining the sidelink pathloss, the sidelink pathloss comprises a sidelink beam formed path loss.

27. The method of claim 25, further comprising:
determining a third candidate value based on the target receive power and a downlink (DL) pathloss associated with a second access link of the multiple access links; and
if the third candidate value is less than the selected minimum, adjusting the sidelink transmission power to the third candidate value.

28. The method of claim 24, further comprising:
using each of multiple concurrent access links of the multiple access links for communication between the UE and the base station; and
wherein the electronic device comprises another UE.

29. The method of claim 24, further comprising receiving an indication of the adjustment value from the base station.

30. The method of claim 24, wherein the adjustment value is determined based on an access link for communication between the UE and a base station and based on a sidelink for communication between the UE and an electronic device.

* * * * *